Patented June 29, 1948

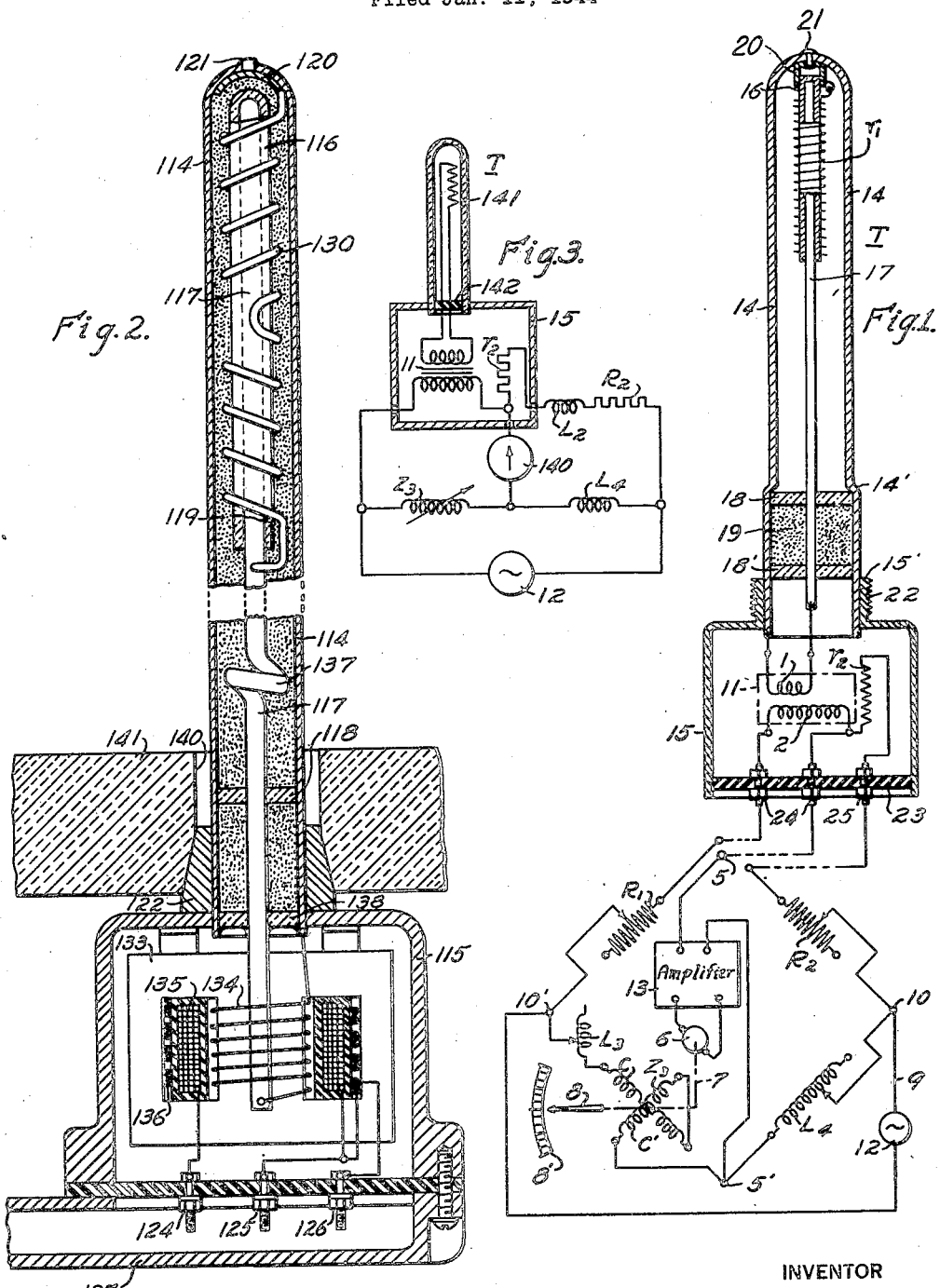

2,444,410

UNITED STATES PATENT OFFICE 2,444,410

RESISTANCE THERMOMETER

George Keinath, Larchmont, N. Y.

Application January 11, 1944, Serial No. 517,795

2 Claims. (Cl. 73—362)

My invention relates to electric resistance thermometers and is related to the subject matter of my copending application, Serial No. 428,028, filed January 24, 1942, now Patent 2,365,706 granted December 26, 1944, of which this is a continuation-in-part.

Electric resistance thermometers, comprising a thermoresponsive resistor as the temperature sensitive measuring organ, are usually connected with an electric measuring circuit of the balanceable type, as represented by a Wheatstone bridge for instance. A variation of the thermoresponsive resistance disturbs the balance of the circuit, and the adjustment necessary for compensating the unbalance serves as a measure of the temperature to be determined.

To realize a rugged construction of a resistance thermometer which is capable of being readily manufactured and of having a high degree of accuracy, the resistance thermometer should be designed on a low resistance basis. It is however undesirable to design the bridge circuit on a low impedance basis, such as would be required were a temperature responsive element of low resistance placed directly in the bridge circuit, for then the resistance of lead connections in the bridge circuit would be of a sufficiently high relative order to become a source of error. Referring to these conditions, it is an object of my invention to afford using a low-resistance temperature responsive element and yet also a measuring circuit having circuit elements of relatively high impedance in order to combine the desired advantages of a low resistance thermometer while avoiding the disadvantages of low impedance measuring circuits.

Another object of the invention is to provide a resistance thermometer of improved mechanical and electrical construction and properties for operation with alternating current.

A further object of my invention is to devise a resistance thermometer which is compensated for ambient temperature variations so as to afford an improved degree of accuracy.

It is also an object of my invention to provide a resistance thermometer which is capable of measuring higher temperatures than those for which the known thermometers of this type were normally applicable, or which has a considerably greater longevity than these known thermometers when used for measuring high temperatures, for instance, above 500° C. (degrees centigrade) up to 800° C. and more.

Still another object, related to those last mentioned, is to devise a thermometric electric unit that is applicable within ranges of high temperature heretofore measured by pyrometric thermocouple devices but affords higher measuring currents and voltages so as to produce for instance, a greater torque in the indicating or recording instrument than that directly obtainable with thermocouples. In comparison with thermocouple instruments, my invention aims also at affording an improved reading accuracy and the possibility of using a "suppressed scale."

In order to achieve these and other objects, which will become apparent from the following description, I provide according to this invention a temperature responsive resistance element of relatively low resistance value with a step-up impedance transformer that has a low impedance winding connected with the resistance element and a high impedance winding to be connected with a measuring circuit. This resistance element and transformer are structurally combined to a single thermometer unit so that variations in resistance of the connecting conductors leading from this unit to the measuring circuit proper are largely prevented from affecting the measuring result.

In conjunction with the latter aspect of my invention and in accordance with another one of its essential features, I provide a temperature responsive compensating resistor in proximity to the transformer for reducing or eliminating the effect on the measuring result of any temperature dependent variation of the transformer, the compensating resistor being arranged so that it is subjected to the same temperature as the transformer.

The foregoing objects and features as well as other characteristics of my invention will be understood from the following description of the embodiments shown in the drawing in which Figure 1 is a partly structural and partly schematic illustration of a resistance thermometer according to the invention in conjunction with a measuring circuit suitable for its operation;

Fig. 2 shows a modified form of the thermometer alone; while

Fig. 3 is a diagrammatic showing of a third embodiment in conjunction with a modified measuring circuit.

Referring to Fig. 1, the measuring system shown therein comprises a thermometer unit which, as a whole, is denoted by the letter T. This unit contains a temperature responsive resistor $r_1$ whose terminals are connected to the secondary 1 of a transformer 11 having a primary 2 for connection with the measuring circuit proper. As will be described more in detail in a later place, the resistor $r_1$ is arranged in a tube 14 and the transformer 11 in a head 15 integral with the tube 14. The head accommodates also a resistor $r_2$ in connection with the primary 2. This resistor has a compensating function as will also be set forth hereinafter.

The illustrated measuring circuit for operating the thermometer unit T consists of a balanceable branched network of the Wheatstone bridge type. One arm of this network includes the transformer primary 2 in series connection with a calibrating resistor $R_1$. Another calibrating resistor $R_2$ in series-connection with the above-mentioned compensating resistor $r_2$ lies in a second arm of the network. A third arm contains an inductance element $L_4$ and the fourth arm of the network includes, in series, an inductance element $L_3$ and a variometer $Z_3$ comprising relatively angularly adjustable coils C and C'. The resistor $R_2$ and inductance element $L_4$ are standard parts but each is preferably adjustable as is shown. The junction points 5 and 5' are interconnected by a zero branch which contains a reversible control means formed by a motor 6. As shown, an amplifier 13 may be interposed between the motor 6 and the zero branch proper. The motor 6 has a mechanical drive connection 7 (diagrammatically shown) to the variometer $Z_3$ and to an indicating means herein simply shown as a pointer 8 and scale 8', it being understood that the pointer is secured directly to the movable coil of the variometer to move in unison therewith. Current is supplied to the bridge circuit from an A.-C. source 12 through leads 9 which are connected to the junctions 10 and 10' of the bridge circuit.

It will be understood that when the bridge is balanced, junction points 5 and 5' have the same potential and no current flows through the zero branch so that the motor 6 remains at rest. However, when the bridge is unbalanced by a variation of the resistance $r_1$ of the thermometer T, current will flow through the motor 6 and cause the motor to turn the movable coil of the variometer in such a direction as to rebalance the bridge circuit thereby restoring the current through the motor to a substantially null value. For a prescribed characteristic of resistance $r_1$ versus temperature and for a like characteristic of the inductance $Z_3$ versus angular deflection of its movable coil, the angular deflections of the movable coil of the variometer to maintain the bridge balanced are directly proportional to the temperature variations of the resistance $r_1$ and will be indicated by the angular deflections of the pointer 8 relative to the scale 8'. Hence, the adjustment of the indicating device 8, 8', automatically effected by the just-described circuit means, is indicative of the temperature to be measured.

For best sensitivity, the arms of the bridge circuit should be substantially equal in impedance; while, to rule out the resistance of lead connections in the bridge circuit as a source of error, the elements directly connected in the bridge circuit should have a substantial value of impedance as of the order of 100 ohms or more. A resistance thermometer having a resistance of 100 ohms at zero degrees centigrade cannot be readily made rugged as the wire constituting the resistance $r_1$ must be very fine. These difficulties are however largely overcome when the thermometer is made to have a low value of resistance, say of the order of only one ohm at zero degrees C.; such a thermometer will withstand much higher temperatures, and the insulation requirements for the wire are then greatly relaxed. The resistance of the thermometer must however be stepped up to present the desired 100 ohms to the bridge circuit. This is done by means of the resistance matching transformer 11 having an impedance ratio of 1 to 100, or in other words a turns ratio of 1 to 10. The use of the resistance matching transformer 11 limits the bridge to A.-C. operation—that is, to being supplied with alternating current from an A.-C. potential source, which may be an independent source 12 as aforementioned, or from a regular 60-cycle lighting circuit. A.-C. operation has the advantage of permitting a greater latitude of design of the bridge circuit in enabling the use of either resistance, inductance or capacitance elements, and of permitting the use of an A.-C. amplifier 13 (diagrammatically shown) between the junctions 5 and 5' and the motor 6, for increasing the sensitivity of the recorder, which amplifier is preferable to a D.-C. amplifier because of its greater stability. Furthermore, A.-C. operation has the highly important advantage of ruling out the need for any sliding contacts in the bridge circuit, as has been explained, and of permitting the use of an A.-C. motor as the null detector, which also may be devoid of sliding contacts.

The transformer 11 is to have a relatively low order of dissipation—i. e., of copper (or resistance) and iron losses. For instance, the effective losses in the transformer expressed in ohms should not be greater than about five per cent of the active resistance of the thermometer. The losses in the transformer should also not vary appreciably with temperature since the transformer and resistance $r_1$ are placed adjacent to one another in one housing to obtain a low resistance connection between the resistance $r_1$ and the primary of the transformer. In this case the transformer will be subjected in substantial degree to temperature variations caused by those to be measured, and must have a high heat resistant insulation, as of asbestos, to withstand high temperatures. In measuring the temperature within a furnace, for example, the temperature of the transformer may be as high as 150° C., for the head 15 will in this case be mounted directly on the wall of the furnace.

My invention contemplates compensating for variations in the losses within the transformer by the use of a compensating means located in juxtaposition to the transformer within the head 15. Unless an especially high degree of accuracy in measurement is required, no compensation is required for the iron losses (from hysteresis and eddy currents) as these losses can be reduced to a very low level by the use of low-loss nickel-iron alloys in the magnetic core of the transformer. The copper losses need however to be compensated for. This purpose is taken care of by the above-mentioned resistor $r_2$ in the head 15 of the thermometer unit T. The resistor $r_2$ consists of copper and is in thermal contact with the transformer 11. As this resistor $r_2$ is series-connected with the standard resistance $R_2$ between the junctions 5 and 10 and in a bridge arm adjacent to the arm of the transformer 11, it will serve to annul the effects in the bridge circuit of variations in the copper losses of the transformer 11, the value of the resistance $r_2$ being appropriately selected to give the desired compensation.

The resistance $r_1$ of the thermometer T comprises a coil of wire composed preferably of platinum and made relatively heavy, say as large as .3 mm. in diameter. The use of such heavy wire provides a high degree of accuracy, for the accuracy increases with the diameter of the wire. In particular, when the wire has a large cross-sectional area, it has less area of exposed surface per unit volume and is subject to less percentage contamination—that is, for a given volume of wire it will not alloy with other metals, will not adsorb and dissolve gases and will not acquire deposits of vaporized metals to the extent that it would were it made with a smaller area of cross-section.

Although the wire element constituting the resistance $r_1$ is made heavy, there is yet need to have it protected in every practically possible way. To this end, it is encased in the tube 14 and mounted on a quartz tube 16 as is shown in Figure 1. This quartz tube is telescoped over the end of a rod 17 which is held concentrically within the tube 14 by a pair of spaced porcelain washers 18 an 18' that embrace the outer end portion of the rod and fit the interior of the tube 14, the inner washer 18 being, for example, abutted against a shoulder 14' on the tube 14 and the space between the washers being suitably filled as with a quartz sand 19. An auxiliary support for the quartz tube 16 is formed by a cap member 20 which fits over the end of the tube 16 and which has a central projecting post 21 that extends through the end of the tube 14 and is welded thereto.

Suitably secured to the open end portion of the tube is the head 15 aforementioned. This head has a reduced diameter portion 15' embracing the tube 14 and threaded at 22 to facilitate connecting the thermometer to a support. The part of the head 15 extending beyond the tube 14 is enlarged in diameter to receive the transformer 11 and the compensating resistance $r_2$. Closing the end of the head 15 is a Bakelite disk 23 which tightly fits the interior of the head.

To provide connections, between the resistance $r_1$ and the primary of the transformer 11, having a magnitude of resistance negligibly small in relation to that of the resistance $r_1$, one of these connections is made through the rod 17, the rod accordingly, being provided with a relatively large diameter as of the order of 4 mm. and the other lead connection is made through the cap 20 and outer tube 14. In order that what resistance these lead connections may have will not vary appreciably with temperature, the rod 17 and tube 14 are made of a metal having a low temperature coefficient of resistance, preferably of the nickel-chromium alloy known under the name of Nichrome which has also the advantage of being a poor heat conductor and of being thus unable to conduct the heat effectively to the head 15 and the transformer 11. The lead connections of the secondary winding of the transformer 11 to the bridge circuit are made through terminals 24 mounted on the Bakelite disk 23. Also, one lead connection of the compensating resistance $r_2$ to the bridge circuit is made through a terminal 25 on the disk 23, the other lead connection of this compensating resistance being however made within the head 15 to one side of the secondary of the transformer 11 as is shown in Figure 1.

Certain advantages and preferable electrical dimensions of the particular measuring network shown in Fig. 1, are explained in my above-mentioned copending application, Serial No. 428,028, now Patent No. 2,365,706, to which reference may be had, if desired. These other details of the exemplified circuit are not relevant to the present invention proper, and it will be understood that measuring circuits other than the one illustrated may be used in connection with thermometer units according to the present invention.

According to the embodiment shown in Fig. 2, a temperature responsive resistor 130 (corresponding to resistor $r_1$ of Fig. 1) is mounted on a ceramic or quartz tube 116 which is placed over one end of a central rod 117. One end of the resistor 130 is attached to a metal cap 120 welded at 121 to the closed end of an elongated tubular enclosure 114. The other end of resistor 130 is in conductive connection with the rod 117. The tube 114 contains at least one ceramic washer or spacer 118 and is filled with quartz sand 119 or the like finely divided filler of insulating material so as to reduce the gas spaces within the enclosure and improving the heat conductivity between the enclosure 114 and the resistor 130. The enclosure 114 surrounds the resistor 130 as closely as feasible in order to keep the heat capacity of the measuring end of the thermometer as low as possible without foregoing a good and permanent electric insulation of the resistor 130 or causing undue difficulties of manufacture. A spacing of about 1 millimeter between the enclosure 114 and the resistor 130 is, as a rule, sufficient and convenient.

The resistor 130 consists, for instance, of platinum. Its resistance, when cold, may be in the order of 1 ohm. In order to reduce its inductance, and to eliminate the effects of magnetic stray fields, the resistor is designed as a bifilar type winding. That is, one portion of it is wound in a direction opposite to that of the other portion.

If desired, the resistance winding 130 can be attached to the quartz tube, by providing the winding with a coating of quartz or other vitreous material and fusing this coating to the tube, although a procedure of this type is not necessarily required. The tube 114 and the rod 117 consist preferably of metal of a low temperature coefficient of electric resistance, such as the above-mentioned nickel-chromium alloy "Nichrome." The rod 117 has one or several bends or turns 137 for compensating its thermal expansion. A heat resistant insulating seal is provided at 138. It consists of vitreous or ceramic material and may form a gas-tight closure at this end of the tube 114. The interior of the tube is evacuated or provided with an inert gas at low pressure to prevent corrosion of the resistor 130 at high temperatures.

When manufacturing the above-described high temperature portion of the thermometer, the following procedure may be followed.

After mounting the quartz tube 116 on the rod 117 and attaching the resistor winding 130 to the rod and to the metal cap 120, the assembly thus formed is inserted into the metal tube 114 so that the pin 121 of cap 120 passes through the corresponding opening of tube 114. The pin 121 is then welded to the tube to obtain a gas-tight seal. Then the tube 114 is filled with quartz sand and provided with the washers 118 and 138, the latter being ready for the sealing operation and to this end provided, for instance, with a solderable metal glaze unless some other sealing technique is to be employed. The assembly is then placed into a furnace and heated at about 500° centigrade. The soldering or other sealing operation is performed at this temperature. Then, the sealed assembly is permitted to cool slowly, preferably while remaining in the furnace. Thus, the air and oxygen contents within the sealed tube is rarified since, after cooling to normal temperature (20° centigrade), the pressure within the tube is reduced to almost one-third of normal atmospheric pressure. Consequently, the remaining gas in the tube is relatively inert so that excessive corrosion of resistor 130 is avoided. At the same time, the reduced pressure at room temperature has the effect that only moderate interior pressures are obtained when the thermometer is subsequently exposed to high operating temperatures. If desired, the pressure during the sealing operation may be reduced to a further extent by connecting the furnace with a vacuum pump; or an inert gas, such as nitrogen, may be substituted for the residual air in tube 114 by means of the corresponding methods known in the manufacture of incandescent lamps or electronic tubes.

Referring now to further details of Fig. 2, the sealed end of tube 114 is attached to the neck 122 of a head portion 115 which forms a housing for the transformer and its appertaining terminals. The transformer has a three-legged laminated magnet core 133 seated on the bottom of the housing 115. The center leg of the core is provided with a low impedance secondary 134 consisting of a relatively heavy copper wire of relatively few turns. A high impedance primary 135 of many turns of relatively fine copper wire is also placed on the center leg of the core. The secondary 134 has its terminals connected with the rod 117 and the tube 114 respectively, while the primary 135 is connected to terminals 124 and 125 mounted on an insulating plate 123. A compensating resistor 136 (corresponding to resistor $r_2$ in Fig. 1) is also placed on the center leg of core 133 and consists of a bifilar winding which at one end is connected to the primary terminal 125 while the other end is attached to a separate terminal 126. The terminals are protected by a removable cover 127. The neck portion 122 of the thermometer head engages a bore 140 of the furnace wall 141.

As in the first described embodiment, the ratio of secondary to primary turns is, for instance, 1 to 10 and the resistance ratio, for instance, 1 to 100. The preferable rating of the compensating resistor 136 depends on the iron and copper losses of the transformer. Using a transformer of low iron losses, one may assume that the copper losses and their temperature dependent changes occur virtually only in the 100 ohms primary circuit and amount to at most about 5 ohms. Hence, the resistor 136 may be rated for 5 ohms when cold, the actual value being, of course, subject to changes in accordance with the temperature responsive resistance changes in the transformer copper.

With respect to both above-described embodiments, the inductivity of the impedance matching transformer may usually be neglected as regards its effect on the balance of the measuring circuit connected to the transformer primary. That is, as long as the transformer inductance remains below 5% of the resistance—and this is normally the case—the error possibly introduced into the measuring result due to the transformer inductance remains below .1%. If the inductance is higher, it is advisable to insert an auxiliary counter-inductance of about the same magnitude in the adjacent arm of the measuring circuit (the arm of $R_2$ in Fig. 1). This can be done by providing the compensating resistor $r_2$ or 136 with a corresponding inductance value, i. e. by using a wholly or partly unifilar resistor; or by adding a separate inductance. Such a separate inductance may be placed into the measuring circuit remote from the thermometer because this inductance may remain cold during the thermometer operation. An additional inductance of this type is shown in Fig. 3 and denoted by $L_3$, the circuit being otherwise similar to that of Fig. 1 as will be apparent from the corresponding reference characters.

Fig. 3 illustrates also some other modifications. For instance, the adjustable inductance $Z_3$ is designed for manual operation, a zero indicator 140 being arranged in the zero diagonal of the bridge circuit. The resistance thermometer T according to Fig. 3 is provided with an insulating protective tube 141 consisting of a ceramic material, as used for pyrometer tubes. This requires an insulating seal 142 traversed by two conductors for connecting the resistor $r_2$ with the transformer 11.

Resistance thermometers according to the invention are applicable for higher temperatures than those heretofore normally applied to thermometers of this type. For instance, temperatures of about 500° C. up to 800° C. and more can be measured in normal and continuous operation. In this respect, these thermometers are competitive to thermocouples. In favorable contrast to the latter, however, my resistance thermometers as disclosed afford a much higher torque in the indicator due to the fact that the available energy is taken from an outside power source which may consist of the customary alternating current line and hence requires no batteries. As a matter of fact, a torque of, say, 10 times that afforded by a thermocouple is readily available. A thermometer according to my invention avoids also the disturbances or errors encountered with thermocouples due to "cold ends" and permits also the application of any suppressed scale, thereby indicating smaller changes of temperature and increasing the reading accuracy.

It will be obvious to those skilled in the art, and is also apparent from the different modifications exemplified in the foregoing, that the design of the thermometers may be varied without departing from the gist and essential characteristics of my invention. I, therefore, wish this specification to be understood as illustrative rather than in a limiting sense.

I claim as my invention:

1. An electric resistance thermometer for measuring high temperatures, comprising an enclosure having an elongated and gas-tight tubular portion of refractory metal closed at one of its ends, a head portion disposed at the other end of said tubular portion, and hermetic sealing means separating the interior of said tubular portion from said head portion; a metal rod extending coaxially within said tubular portion over substantially the entire length of said tubular portion and through said sealing means into said head portion; a quartzlike body of insulating and refractory qualities carried by said rod and enclosing an end portion thereof adjacent to the closed end of said tubular portion; a temperature-responsive resistance winding mounted on said body and electrically connected between said tubular portion and said rod respectively; and electric circuit means disposed in said head portion and electrically connected with said rod and said tubular portion for connecting said winding to a measuring circuit.

2. An electric resistance thermometer for measuring high temperatures, comprising an enclosure having an elongated metal tube closed at one of its ends and a head portion adjacent to the other end of said tube, a rod extending lengthwise within said tube; an insulating refractory body carried by said rod at an end portion thereof adjacent to the closed end of said tube; a temperature-responsive resistance winding of metal mounted on said body and electrically connected to said rod and said tube respectively so that said rod and said tube form connecting leads for said winding; an impedance matching transformer having windings for connecting said leads to a measuring circuit and being disposed in said head portion; said rod and said tube consisting of metal having a temperature coefficient of resistance of a lower order of magnitude than said resistance and transformer windings so that the measuring error of the thermometer is substantially limited to that caused by energy dissipation in said transformer; and temperature-responsive means arranged for substantially compensating such error and disposed in said head portion in proximity to said transformer so as to assume substantially the same temperature as said transformer.

GEORGE KEINATH.

REFERENCES CITED

The following references are of record in the file of this patent:

UNITED STATES PATENTS

| Number | Name | Date |
|---|---|---|
| 1,144,776 | Northrup | June 29, 1915 |
| 1,208,756 | DeKhotinsky | Dec. 19, 1916 |
| 1,379,526 | Childs | May 24, 1921 |
| 1,741,231 | Grondahl | Dec. 31, 1929 |
| 1,910,866 | Van Nostrand | May 23, 1933 |
| 2,049,285 | Bauer | July 29, 1936 |
| 2,097,226 | Miyazaki | Oct. 26, 1937 |
| 2,149,448 | Lederer et al. | Mar. 7, 1939 |
| 2,219,939 | Rich | Oct. 29, 1940 |
| 2,245,700 | Mounce | June 17, 1941 |
| 2,271,975 | Hall | Feb. 3, 1942 |
| 2,297,780 | Pugh, Jr. | Oct. 6, 1942 |
| 2,365,706 | Keinath | Dec. 26, 1944 |

FOREIGN PATENTS

| Number | Country | Date |
|---|---|---|
| 465,614 | Great Britain | May 10, 1937 |